C. BROMBACHER.
Sheet-Metal Bending-Machine.
No. 200,689.          Patented Feb. 26, 1878.
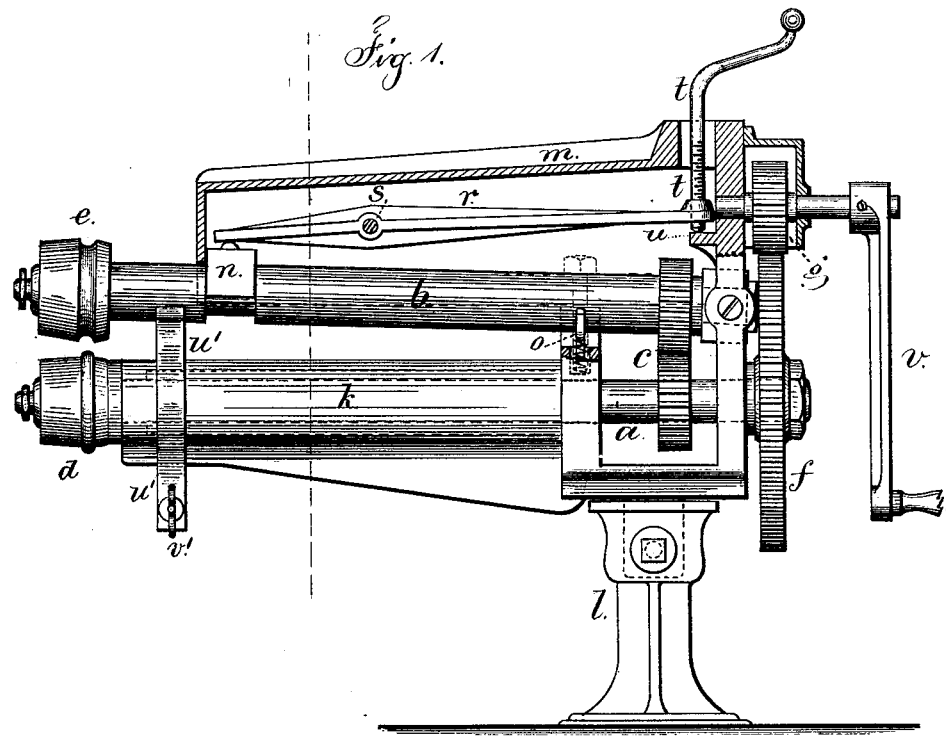
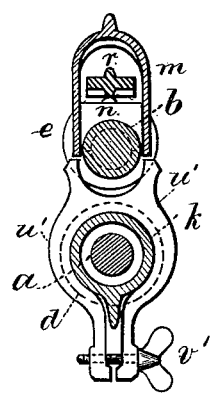
Witnesses
Chas H Smith
Harold Serrell
Inventor
Charles Brombacher
per Lemuel W. Serrell
Atty

UNITED STATES PATENT OFFICE.

CHARLES BROMBACHER, OF TARRYTOWN, NEW YORK.

IMPROVEMENT IN SHEET-METAL-BENDING MACHINES.

Specification forming part of Letters Patent No. 200,689, dated February 26, 1878; application filed January 11, 1878.

*To all whom it may concern:*

Be it known that I, CHARLES BROMBACHER, of Tarrytown, in the county of Westchester and State of New York, have invented an Improvement in Sheet-Metal-Bending Machines, of which the following is a specification:

Machines have been made with two shafts, geared together, and provided with beaded or grooved rollers, between which the sheet metal is passed, and said shafts have been supported by metallic arms, and the outer bearing of the upper shaft has been made adjustable vertically by a set-screw. This, however, is generally at a distance from the crank-handle that is used to operate the machine, and hence is in an inconvenient position for the workman, because he generally holds the sheet metal with the left hand and turns the crank-handle with the right. Therefore he has to change his position in reaching with the right hand from the crank-handle to the adjusting-screw, and the sheet is liable to become misplaced while so doing, and the time of the workman is lost.

In my swaging-machine the upper hollow arm is peculiarly constructed, so as to receive the outer bearing of the upper shaft, and also a lever to act upon the same, and an adjusting-screw near the crank-handle, whereby the swaging-roller can be pressed together upon the sheet metal, and the operator does not have to change the position of his body while actuating the swaging-machine, and the lever enables the operator to exert greater force in bending the sheet metal as the swaging-rollers are closed.

In the drawing, Figure 1 is a sectional elevation of the machine, and Fig. 2 is a cross-section of the hollow arm.

The shafts $a$ and $b$ are geared together by the wheels $c$, and provided with the swaging-rollers $d$ $e$, all as usual, and there is also a wheel, $f$, upon the end of the shaft $a$, and this is driven by the pinion $g$, as heretofore usual.

The lower shaft $a$ is supported in rigid bearings in the lower arm or case $k$ of the supporting-frame, and at the end of such arm, and below it and the frame, there is the standard $l$, to which the arm and frame are connected by a vertical stud passing into a socket, so that the machine can be turned around and clamped in any desired position. The arm or case $k$ is strengthened by a rib at the bottom, as represented.

The upper shaft $b$ is within the hollow arm $m$, that is bolted to the lower part of the frame. The right-hand end of the shaft $b$, adjacent to the wheels $c$, is in a fixed bearing; but the bearing $n$ for the outer portion of the said shaft $b$ is movable vertically within the hollow arm $m$, where it is guided by vertical ribs upon the inner surfaces of the arm.

There is an upward spring-presser, $o$, formed as a segment beneath the shaft $b$, having a vertical pin and spring entering a hole in the frame. This spring is strong enough to lift the outer end of the shaft $b$, and thereby separate the swaging-rolls, and allow for the insertion of the sheet.

Within the hollow arm $m$ is the lever $r$ upon a pivot, $s$, and one end of this lever bears upon the box $n$ of the shaft $b$, and through the other end of this lever passes the adjusting-screw $t$. There is a bracket or lug, $u$, upon the inner surface of this arm $m$, against which the end of the adjusting-screw $t$ acts as it is revolved.

The upper end of the adjusting-screw is crank-shaped, and it is contiguous to the crank-handle $v$ of the machine, so that the operator has to move his right hand but a little distance to reach and operate either.

When the screw $t$ is operated, the longer end of the lever is raised and the other or shorter end depressed upon the box $n$, so as to close the swaging-rollers upon the sheet metal with great force, and bend the same, forming beads or grooves, and these are extended as the sheet metal is rolled through between the swaging-rollers, as usual.

The hollow arm or case $k$ around the lower shaft $a$ forms a support for the gage $u'$, such gage being of a shape to pass between the two shafts and to surround the lower case. There are also two pendent arms to said gage, through which the tightening-screw $v'$ passes to cause the portion of the gage that surrounds the case $k$ to grasp such case and hold the gage when the screw $v'$ is operated.

This construction renders the gage very firm and steady, and there is no risk of the surface of the arm becoming rough or indented by the action of the clamping-screw.

I claim as my invention—

1. The combination, in a sheet-metal-bending machine, of a lower roller and shaft, an upper roller and shaft, a hollow metallic arm, and a bearing for the shaft of the upper roller, and a lever and adjusting-screw for operating the bearing of the upper shaft, substantially as set forth.

2. The sheet-metal-bending machine having a hollow case for the lower shaft, in combination with the gage $u'$, provided with arms, and the screw $v'$ passing through such arms, whereby the gage is made to grasp the case, substantially as set forth.

3. In a sheet-metal-bending machine, the combination, with the lower shaft $a$, of the hollow case $k$, extending from the side of the frame, and carrying the bearing for said shaft $a$, and provided with a rib below such case to sustain the same, substantially as set forth.

Signed by me this 9th day of January, A. D. 1878.

CHAS. BROMBACHER.

Witnesses:
GEO. T. PINCKNEY,
CHAS. H. SMITH.